UNITED STATES PATENT OFFICE.

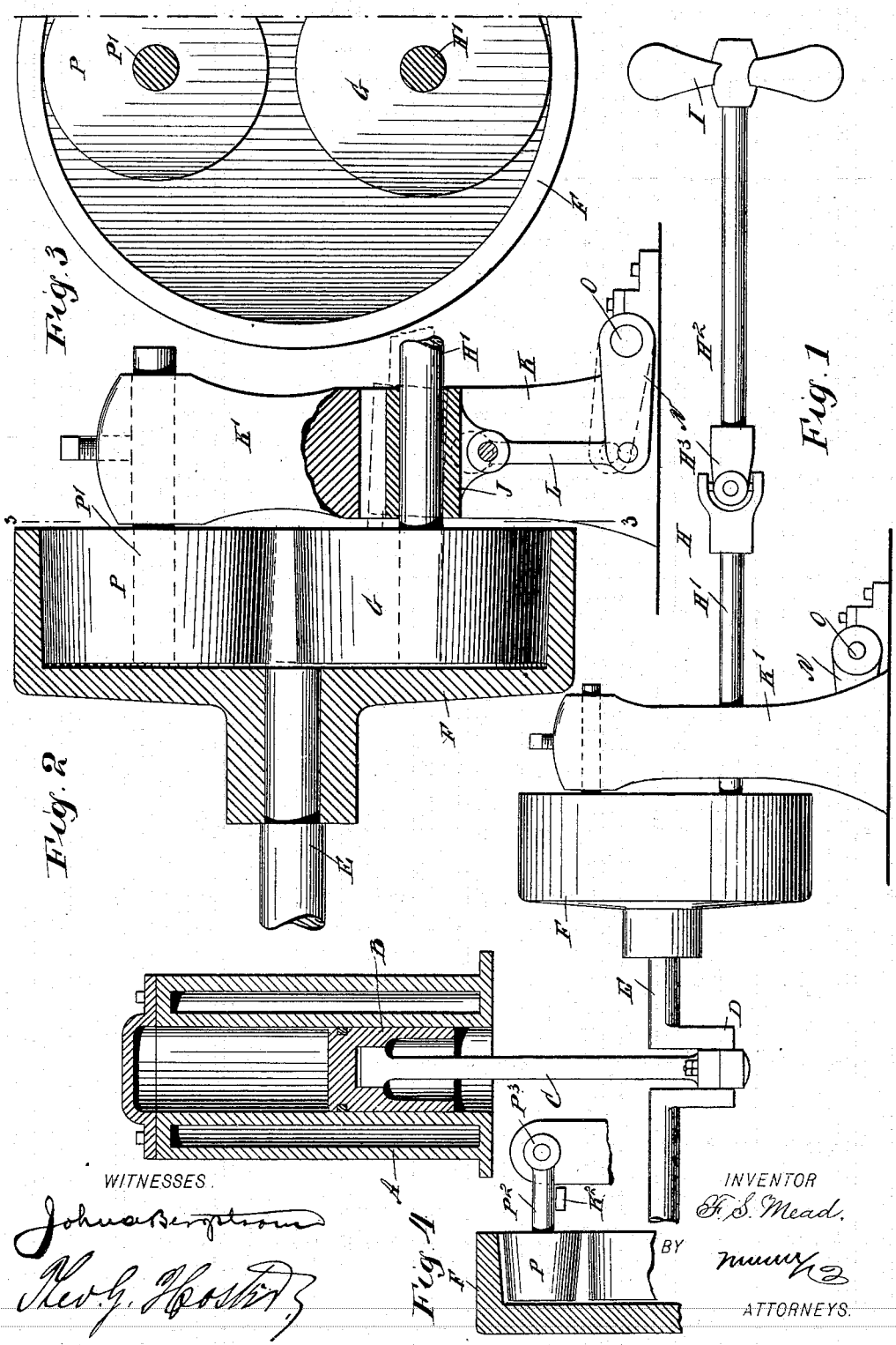

FRANK S. MEAD, OF MONTREAL, CANADA.

REVERSING MECHANISM.

SPECIFICATION forming part of Letters Patent No. 612,257, dated October 11, 1898.

Application filed June 3, 1897. Serial No. 639,266. (No model.)

*To all whom it may concern:*

Be it known that I, FRANK S. MEAD, a citizen of the United States, residing at Montreal, in the Province of Quebec and Dominion of Canada, have invented a new and Improved Reversing Mechanism, of which the following is a full, clear, and exact description.

The object of the invention is to provide a new and improved reversing mechanism for propeller-shafts, the latter being arranged to permit of conveniently and quickly reversing or releasing the driven shaft without changing the direction of the driving or power shaft, the mechanism being more especially designed for use on the propelling-shafts of boats, &c., when the motor is a gas or oil engine or a single-cylinder steam-engine, liable to stop at a dead-center when reversing the same in an ordinary manner.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement with part in section. Fig. 2 is an enlarged sectional side elevation of part of the improvement. Fig. 3 is a transverse section of the same on the line 3 3 of Fig. 2; and Fig. 4 is a sectional side elevation of a modified form of the improvement.

In the engine-cylinder A reciprocates a piston B, connected by a pitman C with the crank-arm D of a crank or power shaft E, carrying at one end a pulley F, engaged at the inside of its rim by a pulley G, preferably made conical and secured on the section H' of a propeller-shaft H, having its other section $H^2$ connected by a universal joint $H^3$ with the section H', above mentioned. On the outer end of the section $H^2$ is secured a propeller-wheel I, as shown in Fig. 1.

The section H' of the propeller-shaft is journaled in a bearing J, fitted to slide vertically in suitable guideways K, so that the pulley G may be moved in or out of mesh with the driving-pulley F. For this purpose the bearing J is pivotally connected by a link L with an arm N on a shaft O, adapted to be turned by the operator, so as to move the bearing J upward or downward and throw the pulley G out of or in mesh with the pulley F and to throw the said pulley G in mesh with an idle-pulley P, adapted to be rotated by the internal surface of the rim of the pulley F.

The idle-pulley P is mounted to turn on a stud P', either secured to a standard K', as shown in Figs. 1 and 2, or the said pulley P may be journaled on a stud $P^2$, pivotally connected at $P^3$ with the said standard, the said stud normally resting on a stop $K^2$ for holding the pulley P out of mesh with the pulley F, but permitting the pulley G to engage the pulley P and swing the same upward until the said pulley is in mesh with the pulley F.

It is evident that by the arrangement described the pulley F rotates the pulley G in the same direction as long as the parts are in the position shown in Figs. 1 and 2, so that the shaft H and propeller I are rotated in the same direction.

When it is desired to reverse the propeller-shaft, the operator turns the shaft O, as above explained, to move the bearing J upward and throw the pulley G out of mesh with the pulley F and to throw the pulley G finally in mesh with the pulley P, rotated by the pulley F, so that motion is transmitted from the pulley P to the pulley G, but in a reverse direction from that it had before. The speed of the pulley G, and therefore the speed of the propeller I, is the same during forward motion as during backward motion. If desired, the operator may throw the pulley G into an intermediate position, so that the said pulley is not in mesh with either of the said pulleys F or P. The propeller-shaft H is then at a standstill.

It is evident that instead of using friction-pulleys F, G, and P, as described, I may employ an internal gear-wheel for the pulley F and pinions for the pulleys G and P.

The pulleys G and P, as well as the internal surface of the rim of the pulley F, are made conical to insure a proper peripheral contact of the parts referred to when the shaft-section H' is moved upward or downward, as above explained, it being understood that the shaft-section H' swings from the center of the universal joint $H^3$ as its fulcrum. Instead of having the uiversal joint $H^3$ and the shaft-section H', I may employ a flexible section carrying the pulley G and directly connected with the section H².

Having thus fully described my invention, I claim as new and desire to secure by Letters Patent—

1. The combination of the driving-wheel, the intermediate wheel journaled eccentrically thereto and arranged to engage the inner surface of the driving-wheel, and the driven wheel likewise journaled eccentrically of the driving-wheel and movable between the intermediate wheel and the inner surface of the driving-wheel, and means for shifting the driven wheel into engagement with either of the other wheels, substantially as described.

2. An annular pulley running continuously in the same direction and driving from its inside surface, an idle-pulley driven from the inside surface of said annular pulley, a stationary or slightly-movable stud upon which said idle-pulley is rotatably mounted and held in one position circumferentially relative to the said annular pulley, and a driven pulley movable to engage either the driving-pulley or the idle-pulley, substantially as shown and described.

FRANK S. MEAD.

Witnesses:
LEWIS P. MEAD,
P. GORMAN.